Feb. 6, 1973 W. J. GRENIER 3,715,077
SHEET METAL TWO-PART SPRINKLER HEAD AND APPARATUS
AND PROCESS FOR MAKING
Filed Dec. 18, 1970 4 Sheets-Sheet 1

WILFRED J. GRENIER
INVENTOR.

BY
Joseph S. Iandiorio
ATTORNEY.

WILFRED J. GRENIER
INVENTOR.
BY
Joseph S. Iandiorio
ATTORNEY.

WILFRED J. GRENIER
INVENTOR.

BY

Joseph S. Iandiorio

ATTORNEY.

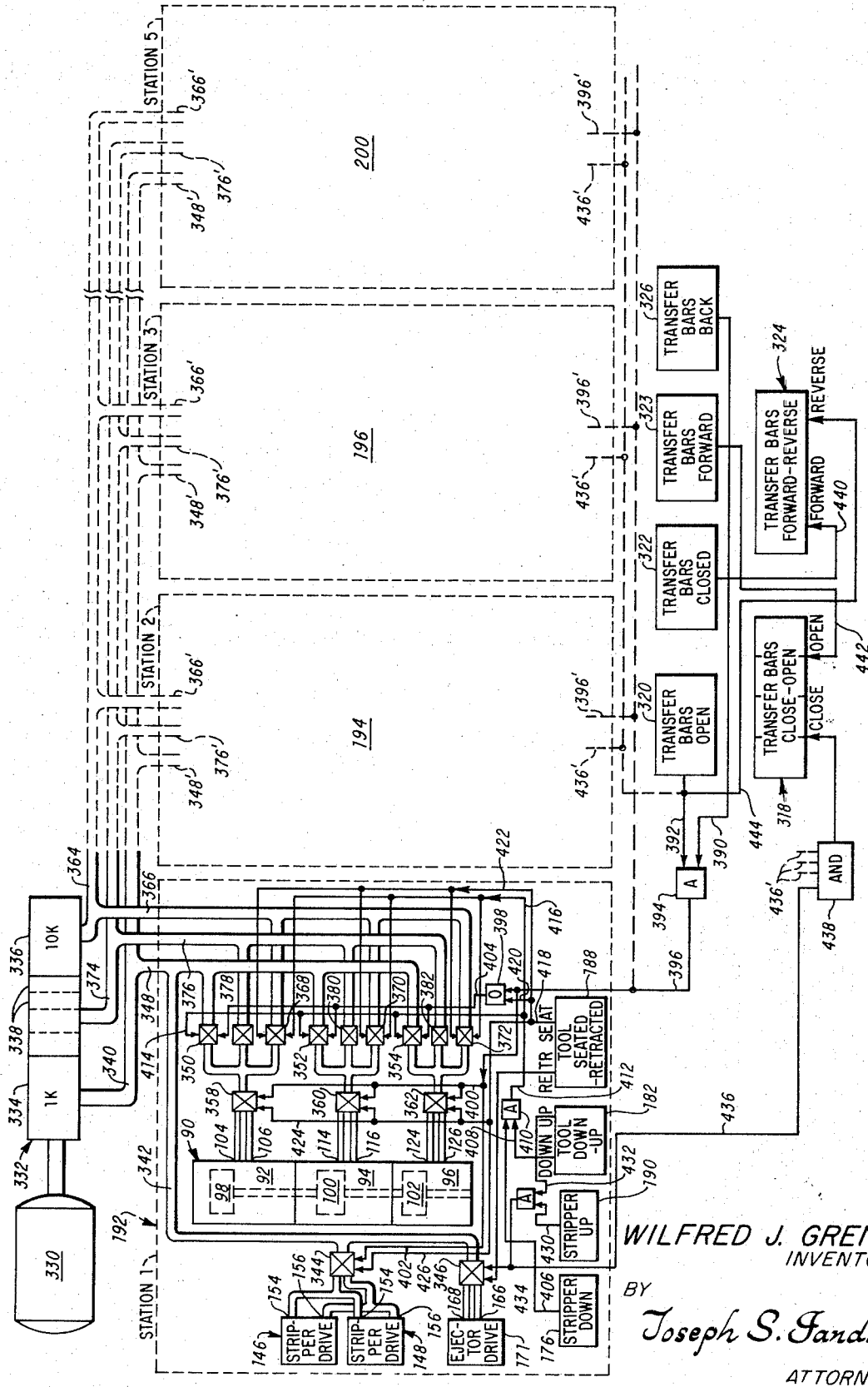

United States Patent Office 3,715,077
Patented Feb. 6, 1973

3,715,077
SHEET METAL TWO-PART SPRINKLER HEAD AND APPARATUS AND PROCESS FOR MAKING
Wilfred J. Grenier, Rutland, Mass., assignor to General Industries, Inc., Worcester, Mass.
Filed Dec. 18, 1970, Ser. No. 99,595
Int. Cl. B05b 1/02
U.S. Cl. 239—200
12 Claims

ABSTRACT OF THE DISCLOSURE

A two-part sheet metal sprinkler head housing is disclosed in which the metal grain is continuous and is in line with the contours of the parts and an apparatus and process for making it.

BACKGROUND OF INVENTION

This invention relates to a two-part sheet metal sprinkler head housing and an apparatus and method for making it.

FIELD OF INVENTION

Conventional sprinkler head housings made by casting and machining are relatively heavy, thick walled and expensive to make. Further, such housings are porous and are often weak in tensile strength. Machined sprinkler head housings are expensive because of the high cost of machine stock, the labor cost involved for machining and the metal waste in the machining operations. When high strength housings are desired, the hardness of the machine stock often requires an annealing before the machining operation can be performed on it. Machine stock and sprinkler head housing made therefrom tend to have some porosity and the grain of the metal in the finished housing is not continuous. For example, assume a housing machined from a piece of bar stock with longitudinal metal grain structure so that the central axis of the housing is parallel to the direction of the grain. Then housing walls parallel to the axis have a grain parallel to the axis and oppose expansion caused by internal sprinkler head pressure with the tensile strength of the metal. But housing walls perpendicular to the central axis of the housing also have a grain parallel to the axis so that their grain is aligned parallel to the expansion force of the internal sprinkler head pressure and they must oppose that force with the shear strength of the metal which is generally much less than the tensile strength. Walls at intermediate angles to the expansion force oppose with varying degrees of shear and tensile strength. Therefore, such sprinkler head housings require thicker walls in order to insure sufficient shear strength to oppose internal pressures. Cast metal sprinkler head housings are highly porous, are weak in both shear and tensile strength and have substantially no continuous grain structure. Their main strength is in compression. To attempt to combat the high porosity and weakness, these types of sprinkler head are made with walls that are quite thick often two or more times as thick as walls in machined sprinkler heads for withstanding similar pressure conditions. In addition, cast sprinkler head housings as well as wholly machined, sprinkler heads require precision machining operations to size the sprinkler head and to provide a smooth finish to the head. Both cast and machined heads may receive hardening operations to increase their strength and porosity.

SUMMARY OF INVENTION

It is therefore an object of this invention to provide a metal sprinkler head housing having high tensile strength, low porosity and a continuous grain in line with the contours of the housing.

It is a further object of this invention to provide such a sprinkler head housing which may be stamped from sheet metal in two parts.

It is a further object of this invention to provide such a sprinkler head housing which can withstand approximately twice the pressure of a machined sprinkler head housing and four times the pressure of a cast sprinkler head housing with the same wall thickness.

It is a further object of this invention to provide such a sprinkler head housing having substantially no porosity.

It is a further object of this invention to provide such a sprinkler head housing which is lighter, stronger, less expensive and less porous than an equivalent size cast or machined sprinkler head.

It is a further object of this invention to provide a process and apparatus for making such a sprinkler head housing whereby the metal need not be annealed for working, whereby the metal hardness is inherently increased by 50% or more and whereby a properly sized and finished sprinkler head housing is produced with little or no machining.

It is a further object of this invention to provide such a process and apparatus resulting in a sprinkler head housing having a smoothness of finish in the range of 4 to 6 lines per microinch.

It is a further object of this invention to provide such an apparatus having a variable power hydraulically powered press for smoothly applying the optimum force to form the sprinkler head housing parts.

It is a further object of this invention to provide such an apparatus having a plurality of such presses arranged for synchronous operation with a transfer mechanism so that the parts can be formed without need for annealing.

The invention features a two-part sheet metal sprinkler head housing including a main body part and a closure part. The main body part includes a first portion forming an orifice for the fluid released when the sprinkler head is tripped, a second portion connected to the first portion and forming a seat support for the internal sprinkler mechanism, a third enlarged portion connected to the second portion for accommodating the internal sprinkler mechanism and a fourth portion connected to the third portion for engaging the closure part of the housing. The metal grain is continuous and is aligned with the contour of the main body part through all of its portions. The closure part includes a first section for connection with a fluid inlet and forming a sealing engagement with the internal sprinkler mechanism, a second enlarged section for accommodating the internal sprinkler mechanism and a trip mechanism, and a third section connected to the second section for engaging with the main body part. The metal grain is continuous and is aligned with the contour of the closure part through all of its sections. The invention also features an apparatus for and method of making, such a sprinkler head housing.

DISCLOSURE OF PREFERRED EMBODIMENT

Other objects, features, and advantages will occur from the following description of a preferred embodiment and the accompanying drawings, in which:

FIG. 7 is a control system for synchronously driving the transfer mechanisms of FIGS. 5 and 6.

Figure 1:
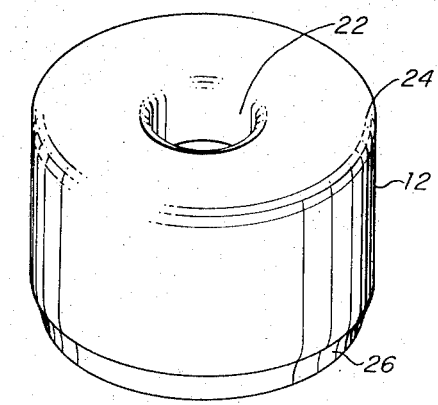
FIG. 1 is an exploded axonometric view of a two-part sprinkler head housing according to this invention.

A sheet metal sprinkler head housing according to this invention, shown in FIG. 1, includes a main body part 10 and a closure part 12. Main body part 10 includes a first cylindrical portion 14 forming an orifice through which fluid is released when the sprinkler head mechanism is tripped. A second, shoulder portion 16 connected to the first portion 14 functions as a seat support for an internal valving mechanism. A third enlarged portion 18 connected to the second portion 16 accommodates the internal valving mechanism and a fourth flared portion 20 connected to the third portion 18 is provided for engagement with the closure part 12. Closure part 12 includes a first cylindrical section 22 for connection with a source of fluid to be controlled by the sprinkler head interval valving mechanism and for sealingly engaging with the portion of the internal valving mechanism. Second enlarged section 24 connected to first section 22 accommodates the internal valving mechanism of the sprinkler head and supports an external heat sensitive tripping device that triggers the valving mechanism when the temperature exceeds a predetermined level. A reduced diameter third section 26 connected to the second section 24 is provided for fitting within the fourth flared section 20 and engaging the main body part 10.

Figure 2:
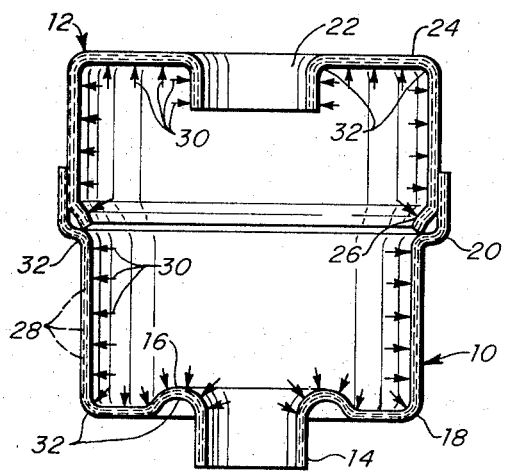
FIG. 2 is a cross-sectional view of a two-part sprinkler head housing according to this invention joined together and showing the continuous grain structure aligned with the contours of the parts.

Since the sprinkler head housing parts 10 and 12 are made from sheet metal conformed to the desired shape, the grain, FIG. 2, indicated as dashed lines 28, everywhere follows the contours of the parts. Such grain alignment produces very high tensile strength of the parts, which is a major factor in the housing's ability to withstand internal pressures that exert forces, arrows 30, perpendicular to the housing walls and make the housing of this invention capable of withstanding higher pressures than cast and machine housings with walls of equal thickness. In addition, the many radii 32, internal and external produced in forming the housing parts, increase their resistance to internal pressures.

Figure 3:
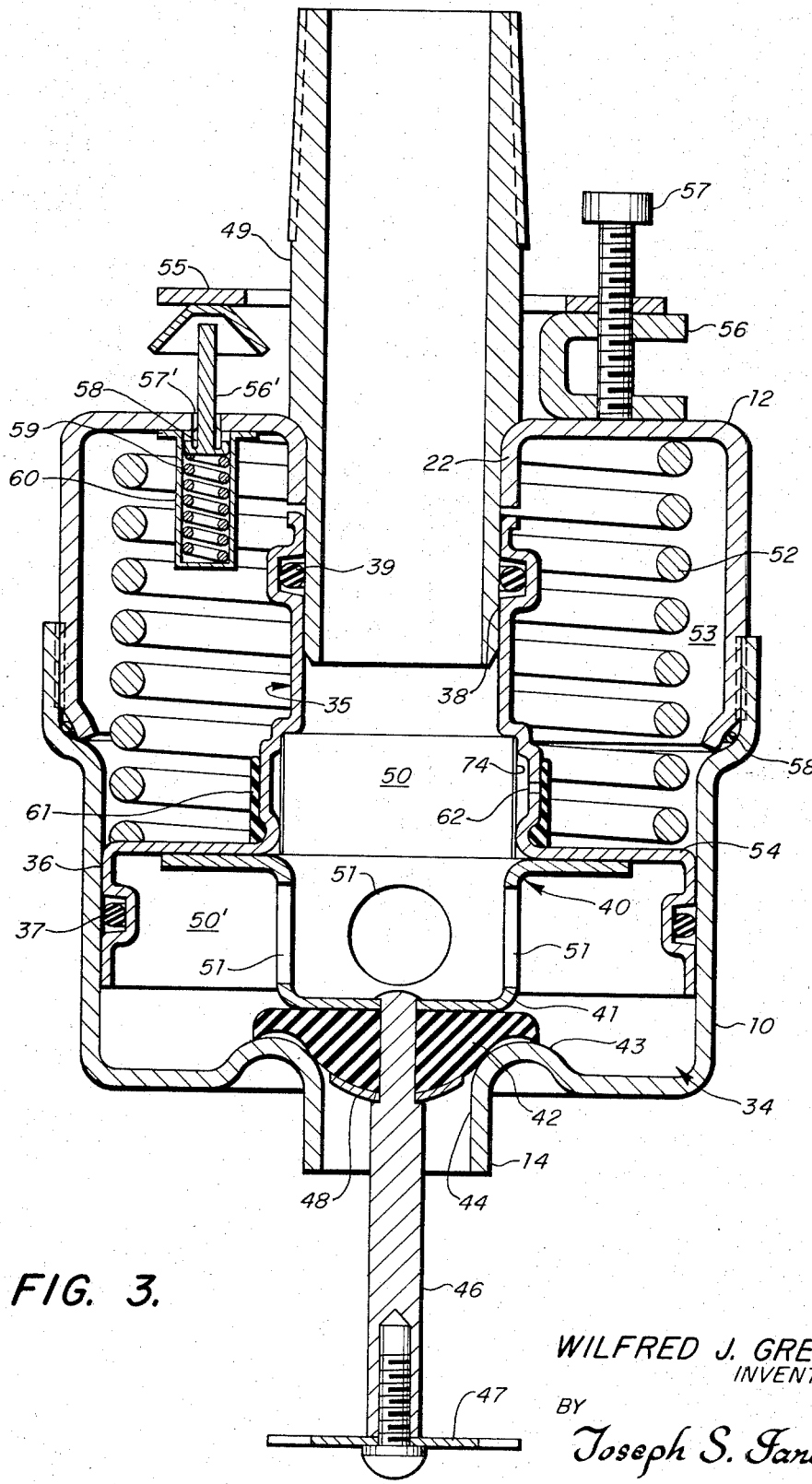
FIG. 3 is a cross-sectional view of a two-part sprinkler head housing according to this invention joined together with a sprinkler head valving mechanism in it.

Although in FIG. 2 the sprinkler head housing parts 10 and 12 are shown united to form a complete housing without an internal valving mechanism, more generally when united they contain a valving mechanism 34 shown in FIG. 3. Mechanism 34 includes an upper slide 35 having an enlarged lower portion whose outer periphery 36 engages the inner wall of main body part 10 and which contains a channel in which is located an O ring 37 to insure positive sealing. The inner periphery 38 of the upper portion of upper slide 35 engages nipple 48 positioned in the second section 22 of closure part 12 and also includes a channel in which is located an O ring 39 to insure positive sealing. Lower slide 40 connected to upper slide 35 has a downwardly extending cup portion 41 which supports a silicon rubber plug 42 which seats on shoulder 43 and controls the flow through orifice 44 in first portion 14. Plug 42 is fastened to the bottom of cup portion 41 by a valve stem 46 which carries at its lower end a deflection plate 47 for deflecting the flow released through orifice 44. Plug 2 is prevented from deforming under pressure by a metal plug plate 48. Normally, when the sprinkler head housing is connected on line through nipple 49, the fluid occupies chamber 50 within upper slide 35 and chamber 50' defined between lower slide 40 and upper slide 35. Chambers 50 and 50' are as one chamber since they are interconnected by the holes 51 in cup portion 41 of lower slide 40. Spring 52 is provided in chamber 53 to bear against shoulder 54 of upper slide 35 to maintain a positive seal between plug 42 and shoulder 43 when the pressure in chamber 50, 50' is equal to that in chamber 53. Bimetallic sensor 55 is mounted to a bracket 56 on top of closure part 12 by means of a calibrating screw 57. Dependent from sensor 55 is a valve stem 56' which passes through port 57' in closure part 12 and carrier at its lower end a valve member 58 which is normally held in sealing engagement with port 57 by a spring 59 in the screen housing 60. A check valve 61 consisting of a rubber cuff surrounds the neck of upper slide 35 and covers the check valve orifice 62 so that when the pressure in chambers 50, 50' exceeds that in chamber 53 fluid will leak through orifice 62 into chamber 53, but when the pressure in chamber 53 equals or exceeds the pressure in chamber 50, 50', the valve 61 is forced against orifice 62 and prevents flow in the other direction.

In operation, when nipple 49 is connected on line, chambers 50 and 50' fill with fluid and build up to line pressure. Since chamber 53 is at atmospheric pressure, the higher pressure in chamber 50, 50' causes fluid to leak through to the check valve orifice 62 into chamber 53. Fluid in chamber 53 cannot escape through the port 57' since valve 58 is held sealed against port 57' by spring 59. Since chambers 50, 50' and chamber 53 have equal pressure, the spring 52 maintains plug 42 in positive sealing contact with shoulder 43. In the event of excessive temperature in the area of the sprinkler head, bimetallic sensor 55 will bend downward at its free end connected to valve 56' opposing the force of spring 59 sufficiently to move valve 58 downward and open port 57'. This causes the fluid under pressure in chamber 53 to escape to the atmosphere, thus decreasing the pressure in chamber 53 below the pressure in chambers 50, 50'. This decrease in pressure unbalances the forces on the upper slide 35 and lower slide 40, such that the bias force of spring 52 is overcome and upper slide 35 is moved abruptly upward on second section 22 of closure part 12. This opens orifice 44 and permits the water or other fire-quenching fluid to escape through orifice 44, strike deflection plate 47 and be sprayed around the surrounding area.

Figure 4:
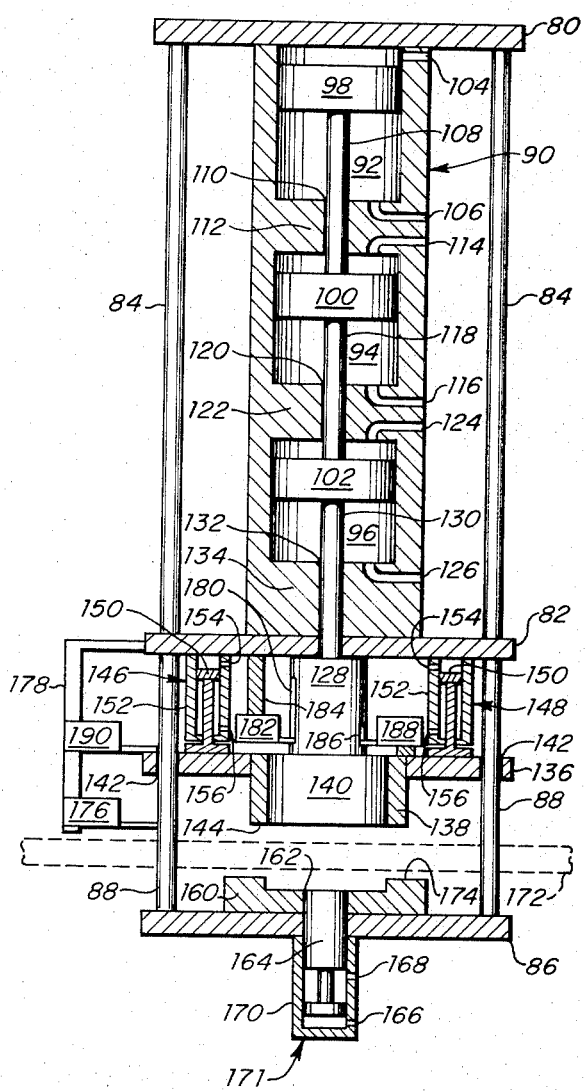
FIG. 4 is a cross-sectional diagrammatic view of a press for stamping a part of the sprinkler head housing.

The sprinkler head housing parts may be formed from sheet metal of from $1/16$ inch to $1/4$ inch in thickness capable of withstanding pressures of 4,000 to 40,000 pounds per square inch to make sprinkler head housings for accommodating lines of $1/4$ to 12 inches in diameter using a punch and die in a hydraulically powered press, FIG. 4. The press may include two fixed square plates 80, 82 secured together by four bars 84 (two shown), and a third fixed square plate 86, secured to plate 82 by four bars 88 (two shown). A cylinder block 90 between plates 80, 82 contains three hydraulic cylinders 92, 94, 96 containing three pistons 98, 100, 102. Piston 98 in cylinder 92 driven downwardly by hydraulic pressure supplied through port 104 and upwardly by hydraulic pressure supplied through port 106 is connected to piston 100 by rod 108 passing through bore 110 in cylinder wall 112. Piston 100 in cylinder 94 driven downwardly by hydraulic pressure supplied through port 114 and upwardly by hydraulic pressure supplied through port 116 is connected to piston 102 by rod 118 passing through bore 120 in cylinder wall 122. Piston 102 in cylinder 96 driven downwardly by hydraulic pressure supplied through port 124 and upwardly by hydraulic pressure supplied through port 126 is connected to cylindrical member 128 by rod 130 passing through bore 132 in cylinder wall 134 and plate 82.

Slidably mounted on bars 88 is a square stripper plate 136 having a central cylindrical sleeve 138 that surrounds punch 140 connected to member 128 and four bores 142 (two shown) that receive bars 88. The lower edge 144 of sleeve 138 extends even with punch 140 when both the punch 140 and plate 136 are fully retracted as shown in FIG. 4. Plate 136 is driven by hydraulic drives 146, 148 each of which contains a piston 150 movable with plate 136 and a cylinder 152 attached to plate 82. Plate 136 is moved downwardly when hydraulic pressure is applied to ports 154 and upwardly when hydraulic pressure is applied to ports 156.

Mounted on plate 86 is a die 160 with a central bore 162 extending through plate 86 to receive ejector bar 164 driven upwardly to eject a workpiece from die 160 when hydraulic pressure is applied to port 166 and downwardly when hydraulic pressure is applied to port 168 of cylinder 170 of ejector drive 171.

Pistons 98, 100, 102 may be driven singly or in combination by the same hydraulic pressure or differing pressures. For example, ports 104, 114, 124 may simultaneously receive hydraulic fluid at a pressure of 1000 lbs. per square inch to drive punch 140 down toward die 160 upon the receipt of a signal indicating that the transfer mechanism 172, a portion of which is shown in phantom in FIG. 4, has released the workpiece and is clear of the work area. Simultaneously with application of pressure to those ports, hydraulic pressure is applied to ports 154 of drives 146, 148 to move stripper plate 136 downwardly with punch 140. When the bottom of punch 140 and edge 14 of sleeve 138 reach the workpiece, not shown, whose edges overlap onto rim 174 of die 160, stripper plate 136 trips the stripper-down switch 176 supported on member 178 and the upper end of slot 180 in member 128 trips the punch down-up switch 182 supported on member 184. Signals from these switches stop drives 146 and 148 from moving stripper plate 136 further and increase the pressure applied at ports 104, 114, 124 to 10,000 lbs. per square inch to force punch 140 to seat in die 160. As punch 140 seats in die 160, the upper end of slot 186 trips the punch seated-retracted switch 188. A signal from switch 88 cuts off the pressure of 10,000 lbs. per square inch at ports 104, 114, 124 and applies a reversing pressure of 1,000 lbs. per square inch to ports 106, 116, 126 to retract punch 140 and simultaneously cuts off the pressure applied at ports 154 and applies pressure at ports 156. As a result punch 140 and plate 136 retract together with punch 140 protruding below edge 144 a distance equal to its penetration into die 160. When stripper plate 136 returns to the fully retracted position shown in FIG. 4, it trips the stripper-up switch 190 supported on member 178. Punch 140 having been retracted with plate 136 trips the punch down-up switch 182 by means of the lower end of slot 180. The presence of signals from both switches 182 and 190 cuts off the reversing pressure at ports 156 of drives 146, 148 arresting further movement of plate 136, provides pressure to port 166 of ejector 170 to drive ejector bar 164 upward to dislodge a workpiece in die 160, and causes the transfer mechanism to close on the workpiece now being freed from the punch and die. While this has occurred in response to the tripping of switch 190, punch 140 has continued to be retracted until it is once again flush with edge 144 whereupon switch 188 is triggered by the lower edge of slot 186 in response to which pressure at port 166 is cut off and pressure is applied to port 168 to retract ejector bar 164. The final movement of punch 140 retracting into sleeve 138 strips off any workpiece clinging to the punch so that the workpiece is free to be engaged by the closing transfer mechanism. The hydraulic press of FIG. 4 is suited to producing the valve housing parts because it is able to smoothly apply the correct amount of force to form each part without overstressing or understressing the metal. This is so because the in-line, multi-cylinder arrangement facilitates tailoring the punch force to precisely that required.

The press of FIG. 4 may be but one of a number of similar presses used in a transfer press to make the two-part sprinkler head housing. For example, the press of FIG. 4 may be one of five presses, 192, 194, 196, 198, 200, FIG. 5, each of which is one station of transfer press for making the main body part 10 of the sprinkler head housing, shown in FIG. 1. Beneath each block, representing a station comprising a press as shown in FIG. 4, is a representation of the workpiece as it appears after being worked at that station. Workpiece 202 at station 1 is a result of the first draw and includes a wide rim 204 with a shallow cylindrical body 206. Workpiece 208 at station 2 is the result of a second draw and includes a slightly reduced rim 210 and a deeper body 212. Workpiece 214 at station 3 is the result of a third draw and includes a narrow rim 216, a deep body 218 and a new narrow cylindrical portion 220 dependent from body 218. Workpiece 222 at station 4 is the result of a fourth draw and includes a narrower rim 224, deep body 226, an internal shoulder 16, visible in FIGS. 1 and 2, and the punched through cylindrical portion 228. Workpiece 230 at station 5 is the result of a fifth draw and provides a piece similar to workpiece 222 but in a more finished form and with rim 224 turned upward to form flared portion 232. Generally a circular blank in a form of disc punched from coil stock sheet metal by a punch and die, such as punch 140 and die 160, FIG. 4, is supplied to the first station of the press in FIG. 5. Alternatively, another station may be added preceding station 1 which punches the blank as a first step in the operation of the transfer press. Additional stations may also be added following station 5, if it is desired to further iron the piece, reduce the radii of the bevels, or to further smooth the finish of the piece. The workpieces are transferred from station to station and are removed from the last station by transfer mechanism 172 including two transfer bars 302, 304, slideably mounted in grooves 306, 308, in end bars 310, 312, for lateral motion toward and away from each other and the workpieces by means of four slides 314 (only three shown), one at each end of each transfer bar 302, 304. Each transfer bar 302, 304 contains five recesses 315, shaped to conform to the workpiece produced at the particular station. Transfer bars 302, 304 are driven together to engage the workpieces and apart to release them by transfer-bar-close-and-open solenoids 318 mounted on means not shown. When fully apart, bars 302, 304 trip the transfer-bars-open switches 320 and when fully closed they trip the transfer-bars-closed switch 322. When the bars are closed, the transfer-bars-forward-and-reverse solenoid 324 moves the four bars 310, 312, 302, 304, mechanism 172, forward to where bar 312 trips the transfer-bars-forward switch 323. When the transfer bars have been opened, solenoid 324 reverses the motion mechanism 172 until the transfer-bars-back switch 326 is tripped.

Figure 6:
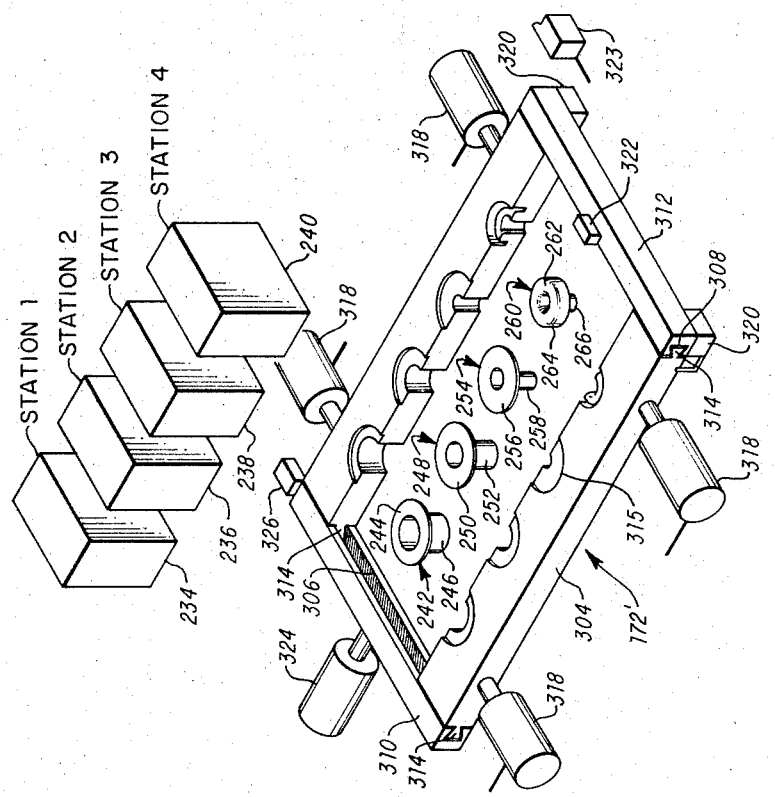
FIG. 6 is a block diagram of a transfer press for stamping a closure part of the sprinkler head housing showing the transfer mechanism and in block form four presses similar to the press of FIG. 4 accompanied by representation of the form of the part at each of those presses.
Figure 5:
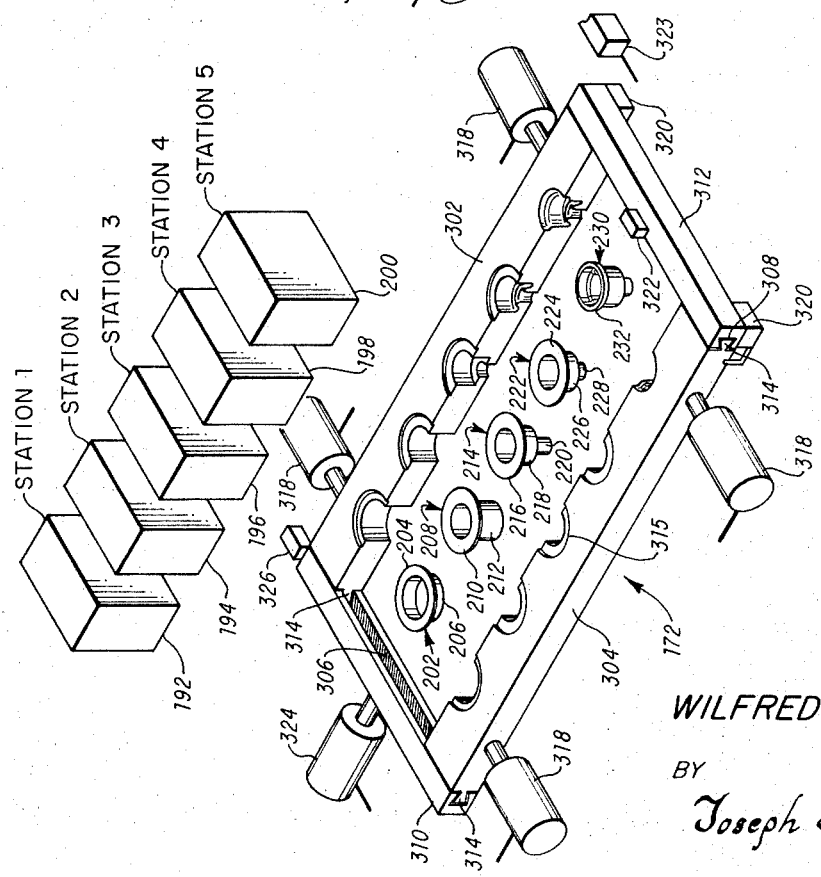
FIG. 5 is a block diagram of a transfer press for stamping the main body part of the sprinkler head housing showing the transfer mechanism and in block form five presses similar to the press of FIG. 4 and accompanied by representation of the form of the part at each of those presses.

Another transfer press, FIG. 6, similar to the transfer press of FIG. 5, is provided for producing the closure part 12. This transfer press includes four stations 234, 236, 238, 240. The workpiece 242 at station 1 is the result of the first draw and includes a wide rim portion 244 and a shallow body 246. Workpiece 248 at station 2 is a result of a second draw and includes a broad rim 250 and a deeper body 252. Workpiece 254 at station 3 is the result of the third draw and includes a broad rim 256 and a narrower body 258 with a hole punched in the bottom of it. Workpiece 260 includes a broad rim 262 with its end folded over to form a downwardly extending flange 264 and a narrow body 266. The transfer press 172' in FIG. 6 is identical with transfer press 172 in FIG. 5 except that it has one less station. In transfer mechanism 172', FIG. 5, like parts have been given like reference numerals primed with respect to transfer mechanism 172, FIG. 5. In the transfer press of FIG. 6, additional preceding or subsequent stations may be added to perform the additional functions as discussed with reference to the transfer press in FIG. 5.

A control system for synchronously operating the five station transfer press of FIG. 5, and four station press of FIG. 6, untilizing presses such as shown in FIG. 4, with the transfer mechanism 172 of FIG. 5 is shown in part in FIG. 7 where like parts shown in block form have been designated by the same numbers as in FIGS. 4 and 5. A motor 330 drives a multi-section pump 332 having a 1,000 lbs. per square inch pressure section 336, or an additional pressure section such as section 338. The output from section 334 is delivered via main line 340 through line 342 to reversing valve 344 serving stripper drives 146, 148, to reversing valve 346 serving ejector drive 171, and through line 348 to selector valves 350, 352, 354 connected to reversing valves 358, 360, 362, respectively. The output from section 336 is delivered via main line 364 through line 366 to selector valves 368, 370, 372 also connected to reversing valves 358, 360, 362. The output from section 338 is delivered via main line 374 through a line 376 to selector valves 378, 380, 382 also connected to reversing valves 358, 360, 362.

In the press at station 1 a pressure of 1,000 lbs. per square inch is used to drive the stripper plate 136, ejector bar 164, and the punch 140 or tool in both directions except for the power stroke of the tool which is driven by 10,000 lbs. per square inch. Similarly, pressure is supplied to each of the remaining stations 202, 204, 206, 208, 210, 212, 214, 216, 218, 220, 222, 224 through lines 348', 376', 366'.

In operation when the transfer-bars-back switch 326 and the transfer-bars-open switch 320 are tripped, signals appear on both input line 390, 392 to AND circuit 394 resulting in an output on line 396 to OR circuit 398 to provide a signal on line 404 to open selector valves 350, 352, 354 to provide a pressure of 1,000 lbs. per square inch at reversing valves 358, 360, 362; on line 400 to set reversing valves 358, 360, 362 to direct hydraulic pressure to ports 104, 114, 124; and on line 402 to set reversing valve 344 to direct hydraulic pressure on line 342 to ports 154 of stripper plate drives 146, 148. Thus stripper plate 136 and tool or punch 140 travel downwardly together until sleeve 138 rests on the workpiece on die 160. At that time the stripper-down switch 176 and tool-down switch 182 are tripped providing signals on both input lines 406, 408 to AND circuit 410 resulting in an output on line 412, which directs a signal on line 414 to close selector valves 350, 352, 354 cutting off the pressure of 1,000 lbs. per square inch at reversing valves 358, 360, 362, and directs a signal on line 416 to open selector valves 368, 370, 372 to provide pressure of 10,000 lbs. per square inch at reversing valves 358, 360, 362. The tool is now driven the final distance to seat in the die and form the workpiece.

Then the tool is seated, the tool seated retracted switch 188 is tripped producing an output on line 418 which directs a signal on line 420 to OR circuit 398 to open selector valves 350, 352, 354; on line 422 to close selector valves 368, 370, 372; on line 424 to reversing valves 358, 360, 362 to stop application of pressure at ports 104, 114, 124 and apply the pressure to ports 106, 116, 126; and on line 426 to provide a signal to reversing valve 344 to switch application of pressure from ports 154 to ports 156. With the reversal of pressure to stripper drive 146, 148 and cylinders 92, 94, 96, tool or punch 140 and stripper plate 136 are retracted together until the stripper-up switch 190 and the tool down-up switch 182 are tripped presenting signals on both input lines 430, 432 to AND circuit 434. The output from AND circuit 434 directs a signal to reversing valve 346 to apply pressure to port 166 of ejector drive 171; a signal on line 436 to one input of AND circuit 438 which receives at its other inputs signals on lines 436' of the same significance from stations 192, 194, 196, 198, 200. When all inputs are present signifying that the work area is clear, a signal from AND circuit 438 directs the transfer-bar-close-and-open solenoid 318 to close the bar son the workpiece. The transfer-bars-closed switch 322 tripped by the closed bars engaging the workpiece provides a signal on line 440 to the transfer-bar-forward-and-reverse solenoid 324 to drive the bars forward so that each workpiece is advanced one station along the transfer press. The transfer-bar-forward switch tripped by the transfer mechanism 172 being in its full advanced position directs a signal on line 442 to direct the transfer-bars-close-and-open solenoids 318 to open the transfer bars and deposit the workpieces at the advanced stations. When the transfer bars are fully open a signal is directed on line 392 to AND circuit 394 and to the transfer-bar-forward-and-reverse solenoid 324 on line 444 to retract the transfer mechanism. When the transfer mechanism is fully retracted the transfer-bars-back switch 326 is tripped producing a signal on line 390 so that both inputs to AND circuit 394 are present and the cycle of operation begins again.

The signal on line 396 from AND circuit 394 is also present on each of lines 346' to initiate operation of each of the other stations 194, 196, 198, 200, each of which includes a similar control system. The pressures applied to each of the hydraulic drives 146, 148, 171 and three piston-cylinder arrangements 92, 98; 94, 100; 96, 102; at each station may be varied according to the force required to hold, work, strip, and eject the workpiece at each station. For example, using 1/16" thick sheet metal stock, the full 10,000 lbs. per square inch of pressure may be used at a station to punch the circular blank from the stock, while the drawing stations may each employ only 2,500 lbs. per square inch. Or if 1/4" stock is used, the full 10,000 lbs. per square inch may be used at each of the drawing stations too.

The press in FIG. 6 may be also operated by a control system such as that of FIG. 7.

A sprinkler head housing whose parts are made from sheet metal according to this invention initially may be capable of withstanding very high pressures dependent upon the strength of the sheet metal stock used. And after stamping the parts will have become stress hardened which may increase their strength by as much as 50%. Further, a housing so produced has low porosity as compared with machined or case housings, even though such sheet metal housings have considerably thinner walls. Sprinkler head housings made in accordance with this invention may be passed from station to station without an annealing operation because the transfer between the stations is done sufficiently quickly so that work hardening does not occur to a substantial degree.

Other embodiments will occur to those skilled in the art and are within the following claims:

What is claimed is:

1. A two-part sheet metal sprinkler head housing comprising:
   a sheet metal main body part, including a first portion forming an outlet for fluid released by an internal valving mechanism when it is tripped, a second portion connected to the first portion and forming an internal shoulder as a seat support for an internal valving mechanism, a third enlarged portion, connected to said second portion, for accommodating the valving mechanism, and a fourth flared portion connected to said third portion, for connection to the other part of the housing, in which the metal grain is continuous and is aligned with the contour of said main body through all of its said portions; and
   a sheet metal closure part, including a first section for connection with a source of fluid to be controlled, a second section for closing one end of said second portion of said main body part, and a third section for connection with said fourth portion of said main body part for joining the two said parts, in which the metal grain is continuous and is aligned with the contour of said closure part through all of its sections.

2. The housing of claim 1 in which said third portion is generally cylindrical in shape with its axis parallel to the direction of flow through the valve.

3. The housing of claim 2 in which said first portioin is generally cylindrical in shape and coaxial with said third portion.

4. The housing of claim 3 in which said fourth portion is an annular flange coaxial with said first and third portion.

5. The housing of claim 4 in which said annular flange is adapted to receive said third section of said closure part to complete the housing.

6. The housing of claim 1 in which said second section is an annular disc with its axis parallel to the direction of flow through the housing.

7. The housing of claim 6 in which said first section is generally cylindrical in shape and coaxial with said second section.

8. The housing of claim 7 in which said third section includes a cylindrical flange coaxial with and surrounding said first section.

9. The housing of claim 1 in which said main body part and said closure part are symmetrical about an axis parallel to the direction of fluid flow through the housing.

10. The housing of claim 1 in which said parts are stress hardened to withstand 40,000 pounds per square inch or more.

11. The housing of claim 1 in which said parts as stamped possess a finish of less than 6 lines per microinch.

12. A sprinkler head housing comprising two stamped sheet metal parts, each said part having a plurality of integral portions of different shapes and having a continuous grain aligned with the contours of said portions, and a valving mechanism included in said housing for controlling the flow of fluid therethrough.

References Cited

UNITED STATES PATENTS

| Re. 23,646 | 4/1953 | McC. Burdick | 239—205 |
| 1,727,075 | 9/1929 | McGravey | 220—42 B |
| 366,177 | 7/1887 | Mackey | 169—41 |
| 2,406,502 | 8/1946 | Lines | 251—367 X |
| 2,156,439 | 5/1939 | Takeda | 29—190 |
| 2,748,464 | 6/1956 | Kaul | 29—DIG. 17 |
| 2,795,467 | 6/1957 | Colwell | 29—DIG. 17 |

LLOYD L. KING, Primary Examiner

M. MAR, Assistant Examiner

U.S. Cl. X.R.

29—DIG. 17; 220—42 B; 239—600